United States Patent [19]

Ueda et al.

[11] Patent Number: 4,485,296
[45] Date of Patent: Nov. 27, 1984

[54] AUTOMATIC TEMPERATURE CONTROL DEVICE FOR AN ELECTRIC APPLIANCE SUCH AS AN ELECTRIC BLANKET

[75] Inventors: Yasukiyo Ueda, Nara; Hirokuni Murakami, Yamatokoriyama; Takashi Iwasa, Nara, all of Japan

[73] Assignee: Matsushita Electric Industrial Co., Ltd., Kadoma, Japan

[21] Appl. No.: 266,592

[22] Filed: May 20, 1981

[30] Foreign Application Priority Data

| May 30, 1980 | [JP] | Japan | 55-73063 |
| May 30, 1980 | [JP] | Japan | 55-73064 |
| Jul. 31, 1980 | [JP] | Japan | 55-106102 |

[51] Int. Cl.³ .............................................. H05B 1/02
[52] U.S. Cl. ................................. 219/505; 219/497; 219/501; 219/212; 219/509; 323/235; 307/231
[58] Field of Search ............... 219/212, 494, 497, 501, 219/505, 507–509; 323/235, 236, 319; 307/231

[56] References Cited

U.S. PATENT DOCUMENTS

| 3,784,843 | 1/1974 | Gustus | 219/501 |
| 3,842,243 | 10/1974 | Gregory | 219/497 |
| 3,866,587 | 2/1975 | Knapp | 219/501 |
| 4,038,519 | 7/1977 | Foucras | 219/505 |
| 4,109,134 | 8/1978 | Van-Herten | 219/505 |
| 4,205,223 | 5/1980 | Cole | 219/505 |
| 4,272,671 | 6/1981 | Hukagawa et al. | 219/505 |
| 4,278,873 | 7/1981 | Petrides | 219/501 |
| 4,296,312 | 10/1981 | Salem | 219/501 |

OTHER PUBLICATIONS

"Electronic Circuits Manual" copyright 1971, McGraw Hill, p. 492.

Primary Examiner—M. H. Paschall
Attorney, Agent, or Firm—Stevens, Davis, Miller & Mosher

[57] ABSTRACT

The automatic temperature control device for an electric appliance such as an electric blanket comprises a heater element, a sensor made of a thermosensitive material having an impedance, which changes as the temperature varies, for detecting the temperature of the heater element, switching means for regulating the supply of electric power to the heater element, and a plurality of electric circuits for driving the switching means in response to the output signal from the sensor. The plurality of electric circuits function to prevent the sensor from being polarized and to detect a temperature signal by applying thereto an alternating current, to detect a failure occurring in the electric circuits in synchronism with zero-crossing pulses, and to detect a failure occurring in the switching means, thereby assuring a safe operation of the automatic temperature control device against the occurrence of any failure.

10 Claims, 9 Drawing Figures

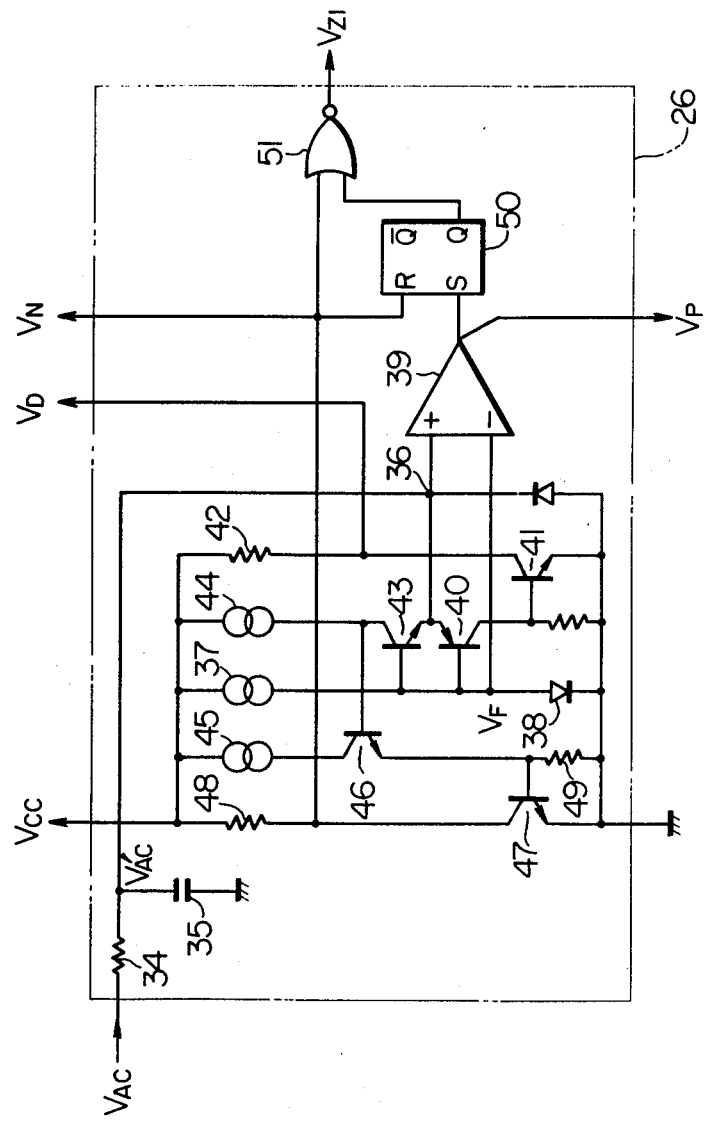
F I G. 5

AUTOMATIC TEMPERATURE CONTROL DEVICE FOR AN ELECTRIC APPLIANCE SUCH AS AN ELECTRIC BLANKET

BACKGROUND OF THE INVENTION

This invention relates to an automatic temperature control device for use in an electric appliance such as an electric blanket, electric carpet or the like.

A conventional automatic temperature control device for an electric blanket has been constructed as shown in FIG. 1. In FIG. 1, reference numeral 1 denotes an ac source, 2 a switch, 3 a wire having double functions of heating and temperature sensing and comprising a heater element 4, a sensor 5 and a control element 6.

The wire 3 has a construction such as shown in FIG. 2 in which the control element 6 is wound helically on an insulating core 7. Also, the sensor 5 separates the heater element 4 from the control element 6. Reference numeral 8 denotes an insulating coating. Practically, the wire 3 is arranged in a serpentine fashion inside an electric blanket. The sensor 5 has a negative temperature coefficient of resistance and is usually formed by a plastic thermistor made of a thermosensitive material. This sensor 5 has an impedance Z related to the temperature T as shown in FIG. 3, wherein the impedance Z is a resultant value of a capacitive impedance $Z_C$ and a resistive impedance $Z_R$, and the temperature sensing property of the sensor 5 is greatly influenced by the capacitive impedance $Z_C$ at low temperatures and by the resistive impedance $Z_R$ at high temperatures. When a DC voltage is applied to a plastic thermistor, the plastic thermistor is polarized and deteriorated to increase its impedance, so that it is necessary to use a plastic thermistor under the application of an ac voltage which is as uniform as possible in its positive and negative polarities.

Then, the conventional example shown in FIG. 1 will be explained in greater detail. In FIG. 1, a switching element 11 (in this example, a semiconductor control device generally known as an SCR is used) is connected in series with the heater element 4 between lines 9 and 10. Similarly, resistors 12 and 13 are connected in series therebetween. Between the junction of the resistors 12 and 13 and a gate of the SCR 11, a variable resistor 14, a resistor 15, the control element 6, a diode 17 and a triggering element 18 are connected in series. Arranged between the control element 6 and the heater element 4 is a capacitor 19. In this automatic temperature control device, during positive half cycles of the ac source voltage in which the line 9 is at a positive potential relative to the line 10, the capacitor 19 is charged at a potential which is determined by the resistance values of the resistors 12 and 13, variable resistor 14, resistor 15 and sensor 5, and when the potential on the capacitor 19 reaches a breakdown voltage of the triggering element 18, a trigger pulse is applied to the gate of the SCR 11 so that the SCR 11 is turned on to supply electric power to the heater element 4. The conduction phase angle of the SCR 11 becomes approximately 0° when the heater element 4 is at low temperature and hence the sensor 5 has a high impedance, thereby supplying maximum electric power to the heater element 4. While, when the temperature of the heater element 4 is high and the impedance of the sensor 5 is low, the conduction phase angle becomes approximately 90° to decrease the supply of electric power to the heater element 4. In this way, the automatic temperature control is carried out. Since the phase angle is changed by the variable resistor 14, the user can obtain a desired blanket temperature by selecting a suitable resistance value for the variable resistor 14.

However, the aforementioned automatic temperature control device has the following disadvantages. Namely, since the circuit comprising the diode 17 is connected in parallel with the sensor 5, the ac voltage applied to the sensor 5 at positive half cycles is different from the ac voltage applied thereto at negative half cycles. Consequently, the sensor 5 is polarized and deteriorated to increase its impedance, which results in a danger such that the controlled temperature shifts to higher temperatures. Further, in the event of a failure of the components used such as short-circuiting of the triggering element 18, the supply of electric power to the heater element 4 becomes uncontrollable still maintaining a maximum amount of electric power supply, thereby causing a danger such that the heater element 4 is overheated. Additionally, a similar danger takes place when the SCR 11 is short-circuited, or a self-triggering failure occurs in the SCR 11 in which the SCR 11 is turned on without being triggered by triggering pulses. Thus, it is possible that these dangerous conditions may cause injury in a worst case situation, since an electric blanket is used by babies or aged persons who cannot push aside an overheated blanket by themselves. Further, the automatic temperature control device employing the phase angle control of an SCR has brought about an unfavourable condition in that noise is generated which causes interference, in particular, with a radio receiver while it is used by a user lying in his bed.

SUMMARY OF THE INVENTION

It is a first main object of this invention to provide an automatic temperature control device which comprises a heater element connected to an ac source, a sensor for detecting the temperature of the heater element, a temperature responsive circuit including a grounded-base transistor with its base-emitter circuit connected in series with the sensor and a diode connected across the base-emitter junction of the transistor with the PN junction of the diode and the base-emitter junction of the transistor connected inversely in parallel with each other, thereby using a collector current of the grounded-base transistor as a temperature signal, an electric potential setting circuit for producing an electric potential thereby to preset a desired temperature, a comparison circuit for comparing an output of the temperature responsive circuit with that of the electric potential setting circuit, and switching means driven by an output of the comparison circuit to regulate electric power supplied to the heater element, and which is featured to supply a uniform ac voltage to the sensor so as to prevent the sensor from being polarized and assure its accurate temperature detection.

An object subsidiary to the first main object is to provide an automatic temperature control device which further comprises an integrating circuit for integrating the output of the temperature responsive circuit (the collector current of the grounded-base transistor) to produce an integration output to be supplied to the comparison circuit and stopping its integrating operation during positive half cycles of the ac source voltage in which electric power is supplied to the heater element, thereby affording a stable and accurate temperature signal.

Another object subsidiary to the first main object is to provide a safe automatic temperature control device which further comprises a power supply interrupting circuit including a heating resistor connected in series with the series circuit of the sensor and the base-emitter circuit of the transistor and a thermal fuse connected to the ac source which can be fused by the heat generated in the heating resistor thereby to interrupt electric power supply to the heater element, whereby, when the heater element is overheated to cause the sensor to melt and the heater element and the control element to be short-circuited to each other, the heating resistor is supplied with an overload which is 17 times as large as its rated load thereby to be heated to interrupt the electric power supply to the heater element.

It is a second main object of this invention to provide a highly safe automatic temperature control device which comprises a heater element connected to an ac source, a sensor for detecting the temperature of the heater element, a temperature responsive circuit for detecting the temperature of the heater element by detecting an impedance of the sensor by means of the control element which is in contact with the sensor, an electric potential setting circuit for producing an electric potential thereby to preset a desired temperature, a pulse supplying circuit for producing a zero-crossing pulse, a pulse discriminating circuit for determining whether an input signal thereto is a pulse and, as a result of the determination of the input pulse, producing an output pulse in phase with the input pulse, a comparison circuit for comparing an output of the temperature responsive circuit with that of the electric potential setting circuit in synchronism with the zero-crossing pulse and supplying a zero-crossing pulse to the pulse discriminating circuit when the temperature of the heater element is below a preset temperature level, and switching means triggered by an output of the pulse discriminating circuit to supply electric power to the heater element, whereby the switching means is triggered by the zero-crossing pulse to enable automatic temperature control with reduced noise generation and the occurrence of any failure in the respective constituent circuits are checked in synchronism with the zero-crossing pulse so as to interrupt the supply of electric power to the heater element when the occurrence of a failure has been detected.

An object subsidiary to the second main object is to provide a highly safe automatic temperature control device wherein the comparison circuit comprises an electric circuit for fixing the output of the electric potential setting circuit to an electric potential level which is lower than a circuit dc power supply voltage by a predetermined magnitude when a zero-crossing pulse does not occur so that the outputs of the temperature responsive circuit and the electrical potential setting circuit are compared with each other in synchronism with input zero-crossing pulses thereby to produce output zero-crossing pulses, and wherein, even when any failure occurs in the output of the temperature responsive circuit and a false output signal appears representing that the temperature of the heater element is very low, it is possible to interrupt the supply of electric power to the heater element.

Another object subsidiary to the second main object is to provide a highly safe automatic temperature control device wherein an SCR is used as the switching means and there is provided an SCR failure sensing circuit for detecting a non-triggering conduction failure (self-triggering) of the SCR to interrupt the supply of electric power to the heater element.

A further object subsidiary to the second main object is to provide an inexpensive and highly safe automatic temperature control device wherein the pulse discriminating circuit is constituted by resistors, a capacitor and switching elements, and in the absence of input zero-crossing pulses the capacitor stores electric charge supplied from the circuit dc power supply through the resistors, and upon receipt of input zero-crossing pulses, the switching elements are turned on to discharge the stored electric charge to the switching means, thus preventing the application of triggering pulses to the switching means when a failure occurs in the electric circuits of the device.

A still further object subsidiary to the second main object is to provide a highly safe automatic temperature control device which further comprises a disconnection sensing circuit for preventing zero-crossing pulses from being applied to the pulse discriminating circuit, when breakage of the control element occurs, by causing the output of the temperature responsive circuit to be shifted apparently to the side of a lower temperature state and to stay there upon occurrence of such breakage of the control element, thereby preventing the temperature under control from becoming high.

A yet further object subsidiary to the second main object is to provide a highly safe automatic temperature control device wherein a plurality of electric circuits such as the disconnection sensing circuit, the comparison circuit, etc. are connected so that zero-crossing pulses are successively transmitted through the circuits and output pulses from the last one of the circuits are applied to the pulse discriminating circuit as input signals thereto whereby a failure of circuit components in the transmission path of zero-crossing pulses can be checked without requiring additional components for use in the checking and the supply of electric power to the heater component can be interrupted when a failure occurs in the circuits.

BRIEF DESCRIPTION OF THE DRAWINGS

These and other objects and advantages of the invention will be more readily perceived from the following detailed discussion which is presented in connection with the following drawings in which:

FIGS. 5, 6 and 7 are circuit diagrams showing details of the respective blocks in FIG. 4.

Reference is firstly made to a block diagram of FIG. 4. For a better understanding of the present invention, reference should also be made to FIGS. 8 and 9. In FIG. 4, a voltage $V_{AC}$ of an ac source 1 is applied to a circuit of a diode 20, a resistor 21 and a capacitor 22 by closing a switch 2 to produce a dc voltage $V_{CC}$ to be used as a dc power supply for the circuits. A temperature responsive circuit as designated by a block 23 detects a current $I_S$ resulting from the amplification of an electric current which flows through a ground line of the ac source 1, the temperature responsive circuit 23, a heating resistor 33, the control element 6, the sensor 5, the heater element 4 and the other supply line of the ac source 1 with its magnitude varying with the change of the impedance of the sensor 5, during negative half cycles of the voltage $V_{AC}$ of the ac source 1, and gives rise to the simultaneous flow of a current $I_T$ which is substantially identical with the current $I_S$. Since the sensor 5 is capacitive, this current $I_S$ leads in phase by about 90° as shown in FIG. 8 and overlaps, in phase, positive half cycles of the ac source voltage in which an SCR 11 is turned on, so that the waveform of the current $I_S$ is distorted by the influence of a potential gradient generated by the heater element 4. Naturally, the current $I_S$ is not distorted when the SCR 11 has been turned off. Therefore, the magnitude of the current $I_S$ has great dependency upon the presence or absence of the distortion, resulting in undesirable variations in the relation between the temperature of the heater element 4 and the magnitude of the current $I_S$. An integrating circuit, such as designated by a block 24, is adapted to integrate the current $I_T$ and produce an output voltage $V_I$ in inverse proportion to the temperature of the heater element 4. For the reasons set forth above, the integrating circuit 24 integrates the current $I_T$ which has excluded a region of the current $I_S$ where the distortion appears. As the temperature of the heater element 4 rises, the impedance of the sensor 5 decreases, resulting in an increased current $I_T$ and a decreased voltage $V_I$. An electric potential setting circuit as designated by a block 25 is adapted to produce a potential $V_S$. The potential $V_S$ is manually variable and may be adjusted by the user to obtain an optimum controlled temperature. A block 26 denotes a pulse supplying circuit which produces various pulses $V_O$, $V_{Z1}$, $V_P$ and $V_N$ in synchronism with the ac source voltage $V_{AC}$. The pulse $V_{Z1}$ stands for zero-crossing pulses which are generated at zero-crossing points through which the waveform of the ac source voltage $V_{AC}$ transfers from negative half cycles to positive half cycles.

Figure 1:
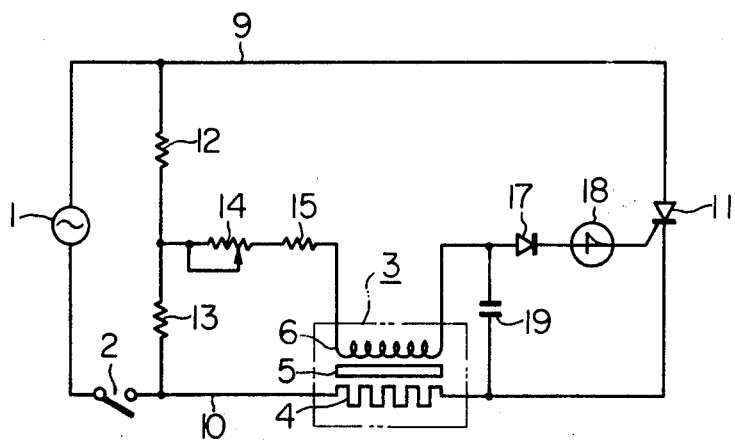
FIG. 1 is a circuit diagram of a conventional automatic temperature control device for an electric blanket.
Figure 2:
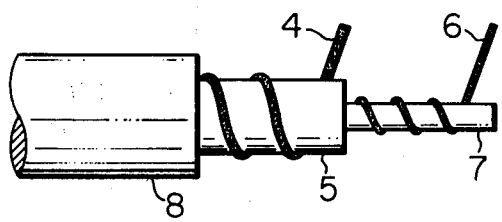
FIG. 2 shows the construction of a wire used in the conventional electric blanket and having double functions of heating and temperature sensing.

A block 27 denotes a disconnection sensing circuit adapted to detect disconnection or breakage of a control element 6 and which produces a voltage $V_X$ to be applied to the control element 6 in synchronism with the zero-crossing pulses $V_{Z1}$ and further produces other zero-crossing pulses $V_{Z2}$ in synchronism with the zero-crossing pulses $V_{Z1}$ if the control element 6 is not disconnected nor broken, thereby allowing an electric current to flow therethrough. Without the disconnection sensing circuit 27, a decrease in the current $I_S$ flowing through the sensor 5 upon occurrence of disconnection or breakage of the control element 6 would give rise to a signal indicative of a decreased temperature of the heater element 4, thereby causing the temperature under control to rise dangerously in excess of a preset temperature.

A block 28 denotes a comparison circuit which, in the absence of the zero-crossing pulses $V_{Z2}$ applied thereto, fixes the output voltage $V_S$ from the electric potential setting circuit 25 at a level of $(V_{CC}-V_F=V_{SF}$, where $V_F$ is a constant forward voltage drop of a diode), and which, in the presence of the zero-crossing pulses $V_{Z2}$ from the disconnection sensing circuit 27, releases the fixed level in synchronism with the reception of the zero-crossing pulses and compares the output voltage $V_I$ from the integrating circuit 24, which is in inverse proportion to the temperature of the heater element 4, with a voltage $V_{ST}$ which is the value of the output voltage $V_S$ from the electric potential setting circuit 25, at this time, thus producing the other zero-crossing pulses $V_{Z3}$ in phase with the zero-crossing pulses $V_{Z2}$ when the detected temperature is below a preset temperature level.

A block 29 denotes a pulse discriminating circuit which, upon receipt of the zero-crossing pulses $V_{Z3}$ from the comparison circuit 28, produces other zero-crossing pulses $V_{Z4}$ in phase with the zero-crossing pulses $V_{Z3}$ which pulses $V_{Z4}$ are applied to the gate of the SCR 11 to trigger it and supply electric power to the heater element 4. When the detected temperature exceeds a preset temperature level or when a failure occurs in the pulse supplying circuit 26, disconnection sensing circuit 27 or comparison circuit 28, no input pulse $V_{Z3}$ is applied to the pulse discriminating circuit 29, and hence there is no output pulse $V_{Z4}$ from the pulse discriminating circuit 29, thereby maintaining the SCR 11 untriggered. When a failure occurs in the pulse supplying circuit 26, disconnection sensing circuit 27 or comparison circuit 28, but the input signal $V_{Z3}$ is applied continuously to the pulse discriminating circuit 29 the output signal $V_{Z4}$ of the pulse discriminating circuit 29 is reduced to a level (practically not more than 0.2 volts) which is so low as to fail to trigger the SCR 11. Thus, the SCR 11 is not triggered also in this case. Further, the pulse discriminating circuit 29 itself is so designed that its output signal $V_{Z4}$ disappears or is reduced to a low level which is insufficient to trigger the SCR 11 when a failure occurs in the pulse discriminating circuit 29 itself.

With the above-described construction, the zero-crossing pulses delivered from the pulse supplying circuit 26 are transmitted successively through the disconnection sensing circuit 27 and comparison circuit 28, whose safe operation has to be assured, and the final output signal causes the pulse discriminating circuit 29 to trigger the SCR 11. In this manner, the respective circuits confirm the occurrence of no failure therein along with the accomplishment of their proper functions while the zero-crossing pulses are generated. Thus, it is possible to accomplish the two functions simultaneously and instantaneously to ensure that the circuits can be kept in highly safe conditions, yet without requiring any great increase of circuits or components for assuring a safe operation of the device. Even when there are involved other circuits, whose safe operation has to be assured, in addition to the two electric circuits of the disconnection sensing circuit 27 and comparison circuit 28 as exemplified in the above construction, the aforementioned safety system can readily assure a highly safe operation of the device. Therefore, it can be said that this safety system has a wide field for its application.

A block 30 denotes an SCR failure sensing circuit. When it is detected that the SCR 11 is turned on in spite of the absence of the zero-crossing pulses $V_{Z3}$ from the comparison circuit 28, the SCR failure sensing circuit 30 applies a heavy load to a heating resistor 31 which load is 17 times as high as a rated load of the heating resistor 31 by making use of output pulses $V_N$ and $V_D$ from the pulse supplying circuit 26, so that the heating resistor 31 is heated to cause a thermal fuse 32 to break, thereby interrupting the supply of electric power to the heater element 4. Accordingly, even if the SCR 11 has been short-circuited or has brought about self-triggering thereof, the supply of electric power to the heater element 4 can be also interrupted.

A wire 3 has a function to detect abnormal heating when abnormal heat is generated accidentally therein. Namely, when the heater element 4 is abnormally heated until the temperature therearound reaches the melting point (167° C.) of the sensor 5 made of a plastic thermistor, the control element 6 is brought into short-circuiting contact with the heater element 4 due to a tensile stress in the control element 6 remaining from the time of its coiling. Then, the heating resistor 33 is supplied with the ac source voltage $V_{AC}$ thereby to be heated by a heavy load current which is 17 times as large as its rated load current. As a result, the thermal fuse 32 is fused to interrupt the supply of electric power to the heater element 4.

In the foregoing, a description has been made of the overall construction of the safety system of the automatic temperature control device according to the invention. The construction of each of the specific circuits employed in the system will then be described in greater detail.

Figure 8:
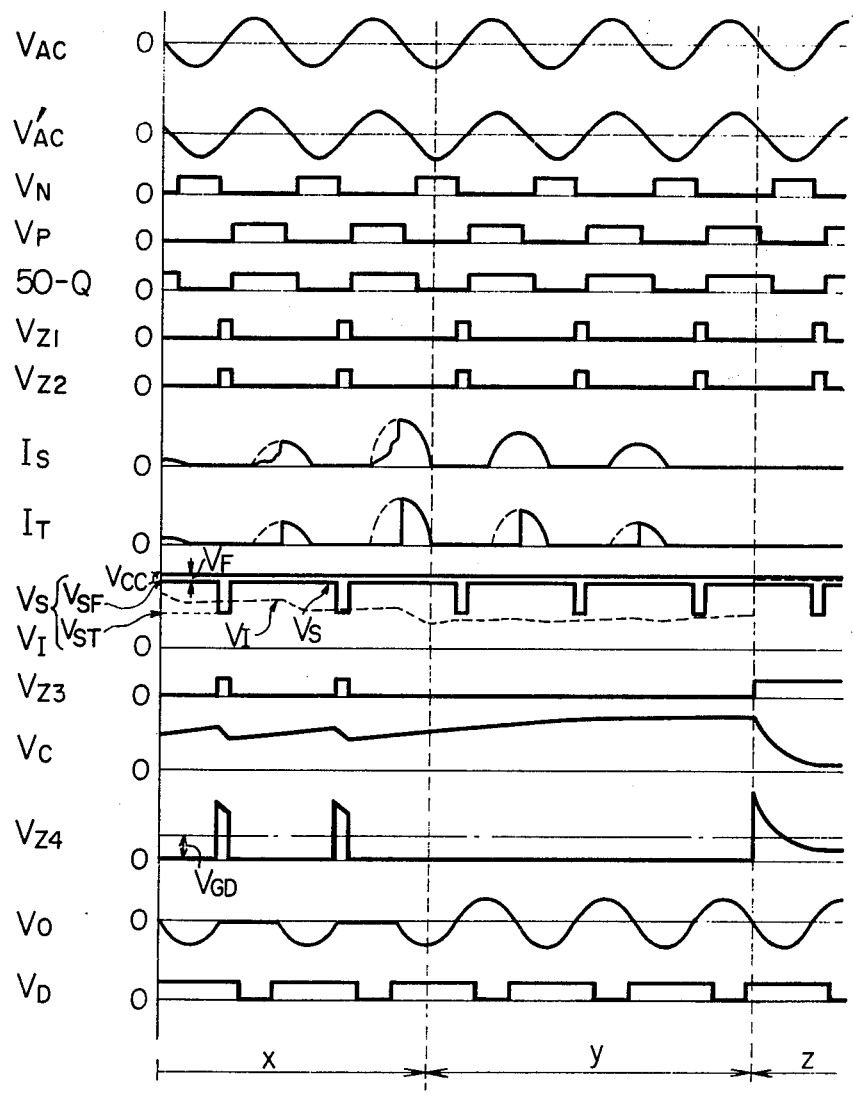

FIG. 5 shows details of the pulse supplying circuit 26 in which the ac source voltage $V_{AC}$ is converted into an ac voltage $V_{AC}'$ whose phase is slightly delayed, as shown in FIG. 8, through a filter constituted by a resistor 34 and a capacitor 35, and the ac voltage $V_{AC}'$ is supplied to a point 36. When the ac voltage $V_{AC}'$ exceeds a reference voltage $V_F$ determined by a constant current source 37 and a diode 38 during a rising positive half cycle, a comparator 39 is inverted to produce an output voltage $V_P$. Thereafter, when the ac voltage $V_{AC}'$ continues to increase and reaches a level of the sum of the reference voltage $V_F$ and a base-emitter forward drop $V_{BE}$ of a transistor 40, transistors 40 and 41 are turned on to generate an output pulse $V_D$ which falls to ground potential. Accordingly, the falling point of $V_D$ is necessarily delayed from the rising point of $V_P$, whereas the rising point of $V_D$ is necessarily in advance of the falling point of $V_P$. As the ac voltage $V_{AC}'$ enters a negative half cycle, a transistor 43 is turned on, thereby turning off transistors 46 and 47, which have been conductive by being fed from constant current sources 44 and 45, and simultaneously generating an output pulse $V_N$ which falls to ground potential. Reference numeral 49 denotes a base-emitter resistor for the transistor 47.

By applying the thus produced pulses $V_P$ and $V_N$ to set and reset terminals of a flip-flop 50, respectively, and then a Q output of the flip-flop 50 and the pulse $V_N$ to a NOR circuit 51, the zero-crossing pulse $V_{Z1}$ is produced from the output terminal of the NOR circuit 51.

A description has hereinabove been made of the ac voltage $V_{AC}'$ whose phase is slightly delayed from that of the ac source voltage $V_{AC}$, the pulse $V_N$ which rises during negative half cycles of the ac voltage $V_{AC}'$, the pulse $V_P$ which rises during positive half cycles of the ac voltage $V_{AC}'$, and the pulse $V_D$ which falls during positive half cycles of the ac voltage $V_{AC}'$ and rises during the positive period of the pulse $V_P$.

Figure 6:
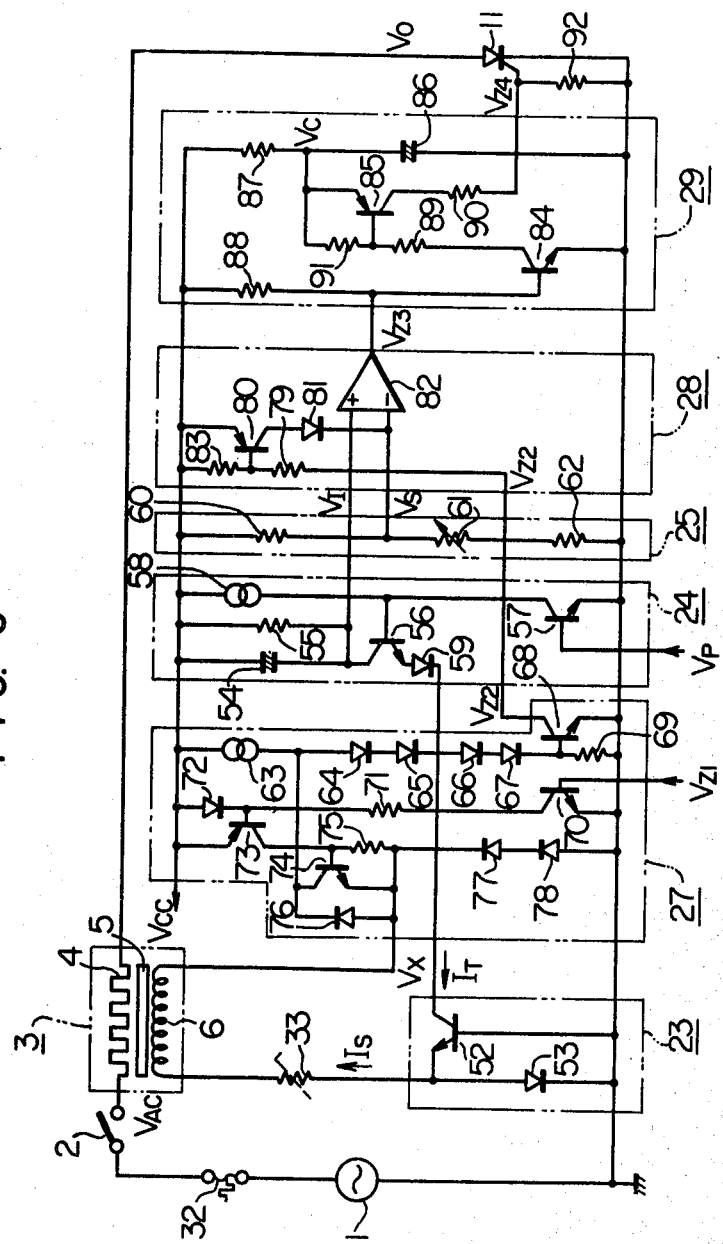

Referring to FIG. 6 which shows in detail the essential structure of the present invention, details of the temperature responsive circuit 23, integrating circuit 24, electric potential setting circuit 25, disconnection sensing circuit 27, comparison circuit 28, and pulse discriminating circuit 29 will be described. For providing a better understanding of the present invention, reference should also be made to FIG. 8.

The temperature responsive circuit 23 comprises a grounded-base transistor 52 and a diode 53 which are connected in antiparallel with the base-emitter circuit of the transistor 52 such that the PN junction of the diode 53 and the base-emitter junction of the transistor 52 are connected inversely in parallel with each other. During positive half cycles of the ac source voltage $V_{AC}$, the supply of electric power to the heater element 4 is controlled, and during negative half cycles of the ac source voltage $V_{AC}$, the impedance of the sensor 5 is detected as an equivalent of the temperature of the heater element 4. The current $I_S$ flowing through the sensor 5 during negative half cycles of the ac source voltage $V_{AC}$ is equal to the emitter current of the transistor 52.

Figure 3:
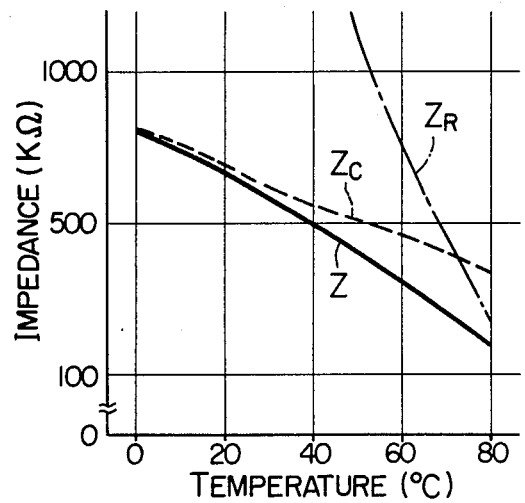
FIG. 3 is a graph showing the relation between the impedance and temperature of a sensor used in the wire.
Figure 4:
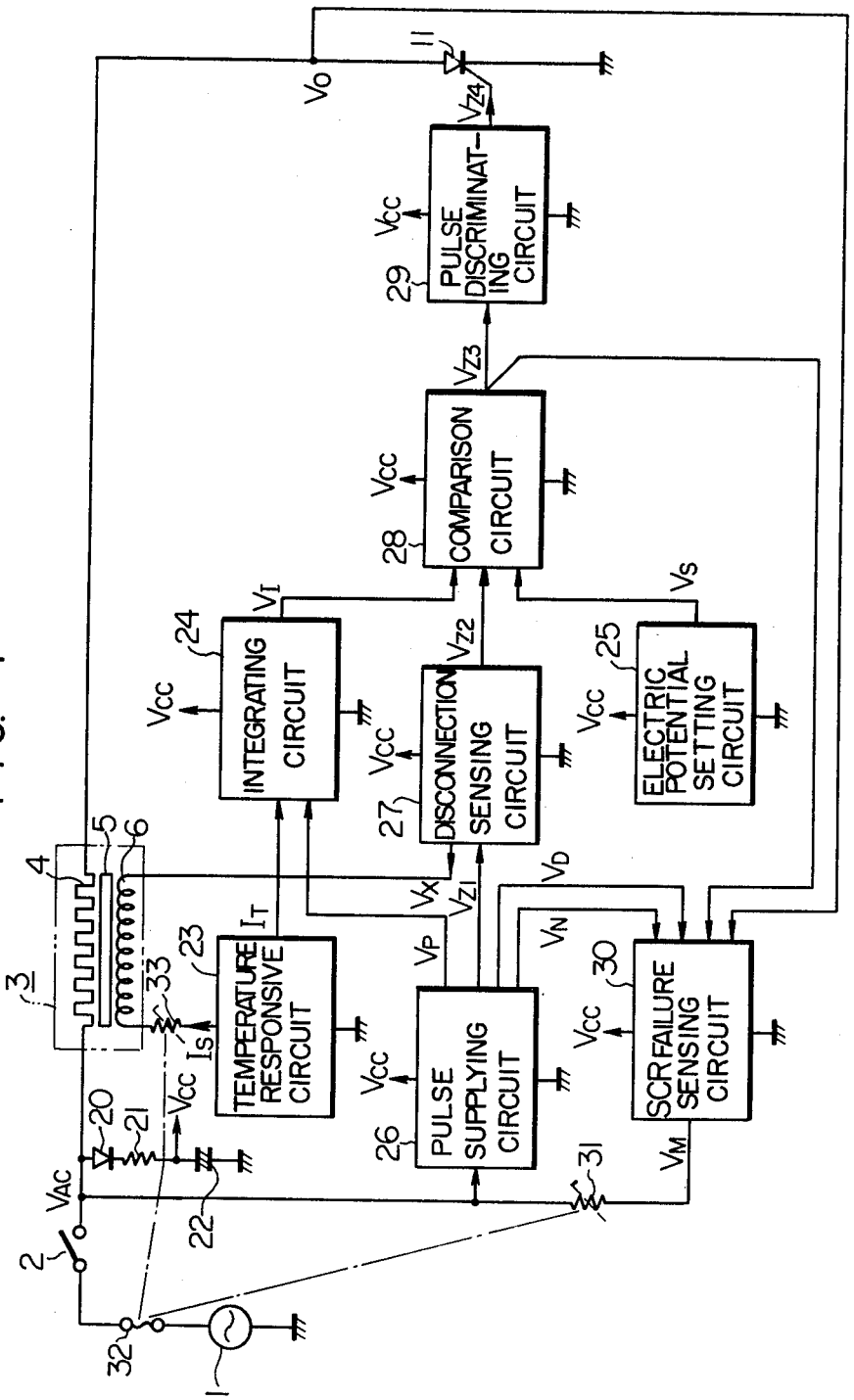
FIG. 4 is a block diagram showing an embodiment of an automatic temperature control device for an electric blanket according to the invention.

In FIG. 8, a period designated by x is one in which electric power is supplied to the heater element 4 and a period designated by y is one in which the supply of electric power to the heater element 4 stops. Since the sensor 5 has a capacitive impedance as shown in FIG. 3, the phase of the sensor current $I_S$ leads that of the ac source voltage $V_{AC}$ by about 90°, so that a portion of the sensor current $I_S$ overlaps the period for controlling the supply of electric power to the heater element 4. As a result, an electric potential gradient caused in the heater element 4 when electric power is supplied to the heater element 4 affects the sensor current $I_S$ to distort the waveform of the overlapping portion of the sensor current $I_S$ as shown in FIG. 8. Naturally, the distortion disappears within the period y in FIG. 8. During positive half cycles of the ac source voltage $V_{AC}$, the current $I_S$ flowing through the sensor 5 passes the diode 53. Since the magnitude of the forward voltage of the diode 53 and the base-emitter voltage of the transistor 52 are substantially equal to each other and further either one of the above-mentioned voltages is far smaller than the voltage $V_{AC}$, the sensor 5 is fed with a symmetrical ac voltage, whereby the promotion of the deterioration of the sensor 5 by the polarization effect is suppressed. The heating resistor 33 is impressed with the ac source voltage $V_{AC}$ when the heater element 4 is heated to reach an abnormally high temperature at which the sensor 5 is melted and the heater element 4 is brought into short-circuiting contact with the control element 6, whereby the heating resistor 33 is heated to fuse the thermal fuse 32. The resistance (390Ω in this example) of the heating resistor 33 is much smaller than the resistance of the sensor 5, so that the insertion of the resistor 33 does not cause an error in the sensor current $I_S$.

The collector current $I_T$, whose magnitude is substantially equal to that of the sensor current $I_S$, flows through the collector of the transistor 52. However, a distortion would appear or disappear in the sensor current $I_S$ depending on the supply or the cessation of supply of electric power to the heater element 4, thus resulting in the corresponding fluctuation of the magnitude of the sensor current $I_S$ or the collector current $I_T$. In order to remove the above-described disadvantage, the integrating circuit 24 is provided to cut the distortion component of the collector current $I_T$ and to produce a dc signal indicative of the temperature under control by integrating the collector current $I_T$ whose distortion component has been removed.

The integrating circuit 24 comprises a capacitor 54 for integrating the collector current $I_T$ and a discharge resistor 55 for gradually discharging electric charge on the capacitor 54. A transistor 56 is provided to cut the distortion component. This transistor 56 staying in the conductive state under the control of a constant current source 58 is turned off to cut the distortion component when a transistor 57 connected in the base circuit of the transistor 56 is turned on by the pulse $V_P$ which rises during positive half cycles of the ac source voltage $V_{AC}$. A diode 59 is provided to assure the turn-off of the transistor 56 when the transistor 57 has been turned on.

A description will be given of the relation between the temperature of the heater element 4 and the output voltage $V_I$ of the integrating circuit 24 brought by the above-mentioned construction. As the temperature of the heater element 4 increases, the impedance of the sensor 5 decreases and the sensor current $I_S$ and the collector current $I_T$ increase. Consequently, the integration voltage of the capacitor 54 increases and the output voltage $V_I$ of the integrating circuit 24 decreases. On the other hand, as the temperature of the heater element 4 decreases, the above-mentioned situation is reversed and the output voltage $V_I$ of the integrating circuit 24 increases. Thus, the output voltage $V_I$ of the integrating circuit 24 varies in inverse proportion to the temperature of the heater element 4.

Next, the electric potential setting circuit 25 has a series circuit of the resistor 60, variable resistor 61 and resistor 62 connected across the circuit dc power supply $V_{CC}$, and its output potential $V_S$ is taken out from a junction of the resistor 60 and variable resistor 61. The resistance of the variable resistor 61 may be varied by the user to adjust the output potential $V_S$ of the electric potential setting circuit 25.

An explanation will be given hereunder of the disconnection sensing circuit 27. The disconnection sensing circuit 27 comprises a transistor 68 which is turned on by being fed with a constant current from a constant current source 63 via diodes 64, 65, 66 and 67 when the zero-crossing pulse $V_{Z1}$ is not supplied to the base of a transistor 70. A resistor 69 is a base-emitter resistor for the transistor 68. When the zero-crossing pulse $V_{Z1}$ is applied to the base of the transistor 70, the transistor 70 is turned on, which causes a transistor 74 to be turned on through a resistor 71 and a current mirror circuit constituted by a diode 72 and a transistor 73 to produce an output potential $V_x$ at the emitter output of the transistor 74. When the control element 6 is not disconnected nor broken, a current is supplied from the constant current source 63 to flow through the control element 6 and simultaneously to cause the transistor 68 to be turned off, thus producing the zero-crossing pulse $V_{Z2}$ at the collector of the transistor 68. If the control element 6 is disconnected or broken, a current cannot flow through the control element 6 even though the transistor 74 is turned on, so that the transistor 68 continues to be conductive and hence no zero-crossing pulse $V_{Z2}$ is generated. Reference numeral 75 designates a base-emitter resistor for the transistor 74. Diodes 76, 77 and 78 are provided to protect the transistor 74 from a surge voltage. The diodes 64, 65, 66 and 67 are provided to assure the turn-off of the transistor 68 when the transistor 74 is turned on.

As will be seen from the above description, when the control element 6 is not disconnected nor broken, the zero-crossing pulse $V_{Z2}$ is produced in phase with the zero-crossing pulse $V_{Z1}$ when the zero-crossing pulse $V_{Z1}$ is applied to the base of the transistor 70.

The comparison circuit 28 will now be explained. The comparison circuit 28 is adapted to compare the output potential $V_I$ from the integrating circuit 24 with the output potential $V_S$ from the electric potential setting circuit 25. In the absence of the zero-crossing pulse $V_{Z2}$ from the disconnection sensing circuit 27, the transistor 68 remains conductive, and a transistor 80 also stays in the conductive state with its base current drawn through a resistor 79, thereby ensuring that the output potential $V_S$ from the electric potential setting circuit 25 is fixed to a level $V_{SF}$ which is lower than the circuit dc power supply voltage $V_{CC}$ by the forward voltage drop $V_F$ of a diode 81. Accordingly, the relation of $V_S > V_I$ holds between the output potential $V_S$ of the electric potential setting circuit 25 and the output potential $V_I$ of the integrating circuit 24, which renders the output level of the comparator 82 low. When the zero-crossing pulse $V_{Z2}$ is produced by the turn-off of the transistor 68, the transistor 80 is turned off to release the output potential $V_S$ of the electric potential setting circuit 25 from its fixed potential level to compare the output potential $V_I$ of the integrating circuit 24 with the preset value $V_{ST}$ of $V_S$ provided by the electric potential setting circuit 25. In this comparison, during the period x shown in FIG. 8 where the temperature of the heater element 4 remains lower than the preset temperature, every time when the relation of $V_S < V_I$ becomes satisfied, the output of the comparator 82 turns to a high level to thereby produce the zero-crossing pulse $V_{Z3}$. On the other hand, during the period y during which the temperature of the heater element 4 remains higher than the preset temperature, the relation of $V_S > V_I$ holds to maintain the output of the comparator 82 at a low level, thereby preventing the generation of the zero-crossing pulse $V_{Z3}$. Reference numeral 83 denotes a base-emitter resistor for the transistor 80. The diode 81 fulfils a useful purpose as described below. When a failure occurs in the temperature responsive circuit 23 or the integrating circuit 24, namely, when an open-circuit failure occurs in the transistor 52, for example, the output potential $V_I$ of the integrating circuit 24 becomes equal to the circuit dc power supply voltage $V_{CC}$. Assuming that the diode 81 is not provided, the output potential $V_S$ of the potential setting circuit 25, which has been fixed to a level $V_{SF}$ lower than the circuit dc power supply voltage $V_{CC}$ by the emitter-collector saturation voltage $V_{CEsat}$ of the transistor 80 when the transistor 80 is conductive, would be released to its non-fixed potential level $V_{ST}$ in synchronism with the generation of the zero-crossing pulse $V_{Z2}$. Therefore, normally the relation of $V_I > V_S$ is maintained rendering the output level of the comparator 82 high, thus preventing the output zero-crossing pulse $V_{Z3}$ from being generated by the comparison circuit 28. It should be noted that the comparator 82 has an input offset voltage $V_{I0}$. Accordingly, when the relation of $V_{I0} > (V_I - V_S)$ holds, the output level of the comparator 82 becomes low when the transistor 80 is turned on. As a result the zero-crossing pulse $V_{Z3}$ is continuously produced from the comparison circuit 28, resulting in the dangerous overheating of the heater element 4. However, owing to the provision of the diode 81, it is possible to have the potential $V_S$ lowered to the level $V_{ST}$ further by the magnitude of the forward voltage drop $V_F$ across the diode 81 even when the transistor 80 is conductive, thereby eliminating the adverse affect by the input offset voltage of the comparator 82.

Next, an explanation will be given of the pulse discriminating circuit 29. When the pulse discriminating circuit 29 does not receive the zero-crossing pulse $V_{Z3}$ from the comparison circuit 28 (i.e., when the output level of the comparator 82 is low), transistors 84 and 85 are nonconductive and a capacitor 86 is gradually charged from the circuit dc power supply voltage $V_{CC}$ through a resistor 87. Upon receipt of the zero-crossing pulse $V_{Z3}$ from the comparison circuit 28 by the base of the transistor 84, the transistor 84 is rendered conductive through a resistor 88 and the transistor 85 is also rendered conductive through a resistor 89. As a result, electric charge stored in the capacitor 86 discharges forming the zero-crossing pulse $V_{Z4}$ through the transistor 85 and resistor 90 to the gate of the SCR 11. Reference numeral 91 denotes a base-emitter resistor for the transistor 85, and reference numeral 92 a gate resistor for the SCR 11.

The pulse discriminating circuit 29 makes use of a specific property of the instantaneously rising pulse waveform of the zero-crossing pulses at the zero-crossing points thereby to effect pulse discrimination. In this example, since the ratio of an occurrence period to a non-occurrence period of the zero-crossing pulses is taken to be 1:42 or more, even when the resistor 87 has a considerably large resistance value, it is possible to produce at zero-crossing points the pulse $V_{Z4}$ of a magnitude sufficient to trigger the SCR 11. As an example in this case, when the circuit dc power supply voltage $V_{CC}$ is 5 volts and the resistance of the gate resistor 92 of the SCR 11 is 1 K$\Omega$, the resistor 87 may have a resistance value of 33 K$\Omega$. Accordingly, even if there occurs a failure to render the transistor 85 continuously conductive (for example, in the cases of an open-circuiting failure of each of the transistor 52, the diode 64 and the resistor 79, and a short-circuiting failure of the transistor 85), the gate of the SCR 11 is supplied only with a voltage not more than a division of the circuit dc power supply voltage $V_{CC}$ by the resistors 87, 90 and 92, for example, 0.15 volt in this case. Since the applied voltage does not exceed a non-triggering voltage $V_{GD}$ of the SCR 11, the SCR 11 is not triggered, and the supply of electric power to the heater element 4 stops. This state is indicated by a period z in FIG. 8. The period z in FIG. 8 is illustrated under the assumption that an open-circuiting failure has occurred in the transistor 52.

Figure 7:
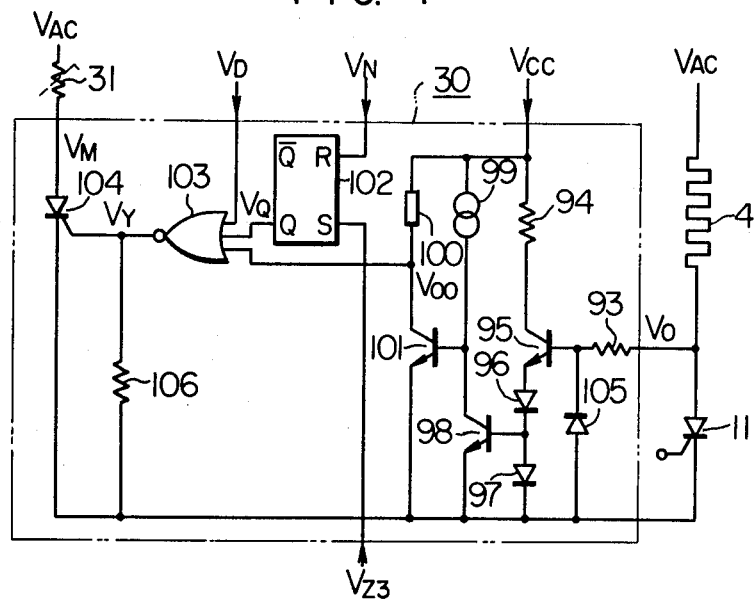

FIG. 7 shows a concrete construction of the SCR failure sensing cirucit 30. This circuit will be described making reference also to FIG. 9.

Figure 9:
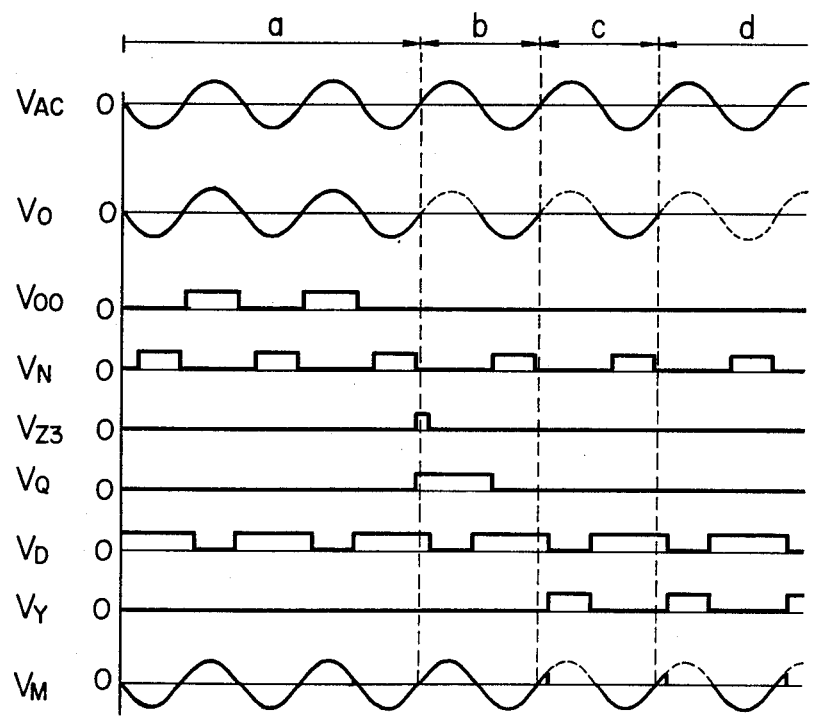
FIGS. 8 and 9 are time charts showing voltage and current waveforms in the circuits of FIGS. 4 and 7.

In FIG. 9, the period "a" denotes a state where the SCR 11 is normal but nonconductive, the period "b" denotes a state where the SCR 11 is normal and conductive, the period "c" denotes a state where a self-triggering failure has occurred in the SCR 11, and the period "d" denotes a state where a short-circuiting failure has occurred in the SCR 11. In FIG. 7, resistors 93 and 94, a transistor 95, diodes 96 and 97, a transistor 98, a constant current source 99, a resistor 100 and a transistor 101 constitute an electric circuit for confirming the turn-off of the SCR 11. During negative half cycles of the ac source voltage $V_{AC}$, the transistors 95 and 98 are turned off and the transistor 101 is turned on, so that the collector voltage waveform $V_{oo}$ of the transistor 100 is at a low level. In the period "a" in FIG. 9 where the SCR 11 is nonconductive, during positive half cycles of the ac power source voltage $V_{AC}$ an input ac voltage $V_o$ rises as the ac power source voltage $V_{AC}$ rises, so that the transistors 95 and 98 are turned on and the transistor 101 is turned off to raise its collector voltage $V_{oo}$ to a high level. Numeral 102 designates a flip-flop circuit, which is provided for storing the presence or absence of the zero-crossing pulse $V_{Z3}$ delivered from the comparison circuit 28.

In the period "a" where the temperature of the heater element 4 is higher than the preset temperature, the zero-crossing pulse $V_{Z3}$ is not produced and the flip-flop circuit 102 is kept reset by the input reset pulse $V_N$ to maintain its output voltage $V_Q$ at a low level. Numeral 103 designates a NOR circuit, which produces an output voltage $V_Y$ of a high level when all of its input voltages are of a low level, but which does not deliver any output voltage of a high level during the period "a", since the pulses $V_D$ and/or $V_{oo}$ of a high level are supplied to the NOR circuit 103 during the period "a".

In the period "b" the pulse $V_{Z3}$ is produced to turn on the SCR 11 when the temperature of the heater element 4 falls below the preset temperature. The input voltage $V_o$ does not rise during positive half cycles of the ac power source voltage $V_{AC}$, so that it follows that the transistors 95 and 98 remain nonconductive and the transistor 101 remain conductive to maintain its collector voltage $V_{oo}$ at a low level. On the other hand, the flip-flop circuit 102 is set by the input set pulse $V_{Z3}$ and maintains its output voltage $V_Q$ at a high level during positive half cycles of the ac voltage $V_{AC}$. As a result, high level inputs to the NOR circuit 103 are maintained by the pulses $V_D$ and/or $V_Q$ to prevent a high level output voltage from being generated by the NOR circuit 103. In this manner, in normal operation, the generation of a high level output voltage by the NOR circuit 103 is prevented.

In the period "c" where the SCR 11 conducts due to its self-triggering in spite of the absence of the pulse $V_{Z3}$, the flip-flop circuit 102 maintains its output voltage $V_Q$ at a low level because of the absence of an input set pulse thereto. As a result, there occurs a period in positive half cycles of the ac voltage $V_{AC}$ where all the inputs to the NOR circuit 103 take a low level to render the output voltage $V_Y$ of the NOR circuit 103 high. Consequently, an SCR 104 is triggered to supply the heating resistor 31 with a heavy load which is 17 times as large as its rated load. Thus, the heating resistor 31 is heated to fuse the thermal fuse 32, thereby interrupting the supply of electric power to the heater element 4.

In the period "d" where the SCR 11 conducts due to a short-circuiting failure in spite of the absence of the pulse $V_{Z3}$, the SCR 104 is triggered in the same manner as the period "c", and the heating resistor 31 is heated to fuse the thermal fuse 32 so that the supply of electric power to the heater element 4 may be interrupted.

In FIG. 7, a diode 105 is provided to protect the transistor 95 and the diodes 96 and 97 against a high backward voltage which appears during negative half cycles of the ac power source voltage $V_{AC}$. Numeral 106 designates a gate resistor for the SCR 104.

What we claim is:

1. An automatic temperature control device for an electric appliance comprising:
   a heater element connected to an alternating current source to be fed therefrom;
   a sensor made of a thermosensitive material having an impedance, which changes as the temperature varies, for detecting the temperature of said heater element;
   a temperature responsive circuit including a grounded-base transistor with its base-emitter circuit connected in series with said sensor, the series connection being connected across said alternating current source, and a diode connected across the base-emitter junction of said transistor so that the P-N junction of said diode and the base-emitter junction of said transistor are coupled in the direction opposite to each other, whereby a collector current of said grounded-base transistor is used as a sensed signal;

an electric potential setting circuit for producing an electric potential for setting a desired temperature;

a comparison circuit for comparing an output signal of said temperature responsive circuit with an output signal of said electric potential setting circuit; and switching means driven by an output of said comparison circuit and connected in series with said heater element for regulating the supply of electric power to said heater element.

2. An automatic temperature control device according to claim 1 wherein the thermosensitive material of said sensor is interposed between said heater element and a control element, said heater element, said sensor and said control element composing a wire.

3. An automatic temperature control device according to claim 1 further comprising an integrating circuit for integrating the output of said temperature responsive circuit and producing an integration output to said comparison circuit.

4. An automatic temperature control device according to claim 2, wherein said heater element, said sensor and said control element forming said wire are arranged such that one of said heater element and said control element is coated with said sensor and the other one of said heater element and said control element is wound on said sensor with a tensile force, and wherein said device further comprises a power supply interrupting circuit including a heating resistor connected in series with the series connection of said sensor and the base-emitter circuit of said grounded-base transistor, and a thermal fuse connected in series with the alternating current source, whereby, when said sensor melts by the over-heating of said heater element to establish a short-circuiting contact due to the tensile force between said heater element and said control element, said thermal fuse is interrupted by the heat generated by an excessive current flowing through said heating resistor to stop the supply of electric power to said heater element.

5. An automatic temperature control device according to claim 3, wherein said integrating circuit comprises integration stopping means for stopping the integration of the output of said temperature responsive circuit during positive half cycles of said alternating current source voltage in which electric power is supplied to said heater element.

6. An automatic temperature control device for an electric appliance comprising:

a heater element connected to an alternating current source to be fed therefrom;

switching means triggered by a triggering pulse for regulating the supply of ac power to said heater element;

a sensor made of a thermosensitive material having an impedance, which changes as the temperature varies, for detecting the temperature of said heater element;

a temperature responsive circuit for detecting the temperature of said heater element by detecting a change in the impedance of said sensor;

an electric potential setting circuit for producing an electric potential for setting a desired temperature;

a pulse supply circut for producing a zero-crossing pulse;

a comparison circuit for comparing an output signal of said temperature responsive circuit with an output signal of said electric potential setting circuit in synchronism with the zero-crossing pulse and producing another zero-crossing pulse when the temperature of said heater element is lower than the set desired temperature; and a pulse discriminating circuit which comprises a circuit formed of resistors, a capacitor and switching elements operating such that in the absence of said another zero-crossing pulse supplied thereto from said comparison circuit, the capacitor stores electric charge supplied from a dc power supply through a resistor, and, upon receipt of said another zero-crossing pulse, the switching elements are turned on to discharge the electric charge stored in the capacitor through said switching means to supply the triggering pulse thereto.

7. An automatic temperature control device according to claim 6 further comprising at least one control element cooperating with said sensor for supplying a temperature sensing electric current which varies depending on the impedance of said sensor, wherein the thermosensitive material of said sensor is interposed between said heater element and said control element, said heater element, said sensor and said control element composing a wire.

8. An automatic temperature control device according to claim 6 wherein said comparison circuit comprises a circuit for fixing the output level of said electric potential setting circuit to an electric potential which is lower than a circuit dc power supply voltage by a predetermined magnitude during a period in which the zero-crossing pulse does not occur.

9. An automatic temperature control device according to claim 6 wherein said switching means is an SCR, and an SCR failure sensing circuit is provided to detect the conduction of the SCR, when the SCR is not triggered, and thereby to stop the supply of electric power to said heater element.

10. An automatic temperature control device according to claim 6 further comprising a disconnection sensing circut for preventing said another zero-crossing pulse from being applied to said pulse discriminating circuit when a breakage failure occurs in said control element, wherein a plurality of electric circuits including said disconnection sensing circuit and said comparison circuit are connected so that the zero-crossing pulse is successively transmitted through the plurality of electric circuits, and said another zero-crossing pulse is applied to said pulse discriminating circuit.

* * * * *